United States Patent
Suzuki et al.

(10) Patent No.: US 7,072,734 B2
(45) Date of Patent: Jul. 4, 2006

(54) METHOD AND APPARATUS FOR CONTROLLING A MACHINE TOOL

(75) Inventors: Yasuhiko Suzuki, Aichi pref. (JP);
Katsuki Sugiura, Aichi pref. (JP);
Masahiro Kurata, Aichi pref. (JP);
Makoto Tanahashi, Aichi pref. (JP)

(73) Assignee: Yamazaki Mazak Corporation, Aichi Pref. (JP)

(*) Notice: Subject to any disclaimer, the term of this patent is extended or adjusted under 35 U.S.C. 154(b) by 0 days.

(21) Appl. No.: 10/996,618

(22) Filed: Nov. 24, 2004

(65) Prior Publication Data
US 2005/0119784 A1    Jun. 2, 2005

(30) Foreign Application Priority Data
Nov. 28, 2003 (JP) ............................. 2003-399951

(51) Int. Cl.
*G06F 19/00* (2006.01)
*G05B 11/01* (2006.01)
*G05B 13/02* (2006.01)

(52) U.S. Cl. .................... 700/189; 700/13; 700/34; 700/54; 700/173; 700/174; 700/177; 700/187; 700/188

(58) Field of Classification Search .............. 700/13, 700/28, 32, 33, 34, 41–43, 46, 54, 55, 67–71, 700/160, 173–175, 177, 193, 187–189
See application file for complete search history.

(56) References Cited

U.S. PATENT DOCUMENTS 4,694,401 A * 9/1987 Higuchi .................. 700/169
5,994,863 A * 11/1999 Fujita ..................... 318/568.15

FOREIGN PATENT DOCUMENTS

| | | |
|---|---|---|
| DE | 19639976 | 4/1998 |
| EP | 0530032 A2 | 3/1993 |

* cited by examiner

*Primary Examiner*—Leo Picard
*Assistant Examiner*—Sean Shechtman
(74) *Attorney, Agent, or Firm*—Sheridan Ross P.C.

(57) ABSTRACT

When a command radius r of a circular interpolation control exceeds a threshold value, a computer computes a speed limit for the circular speed at which the acceleration becomes constant. When the command radius r of the circular interpolation control is less than or equal to the threshold value, the computer 100 computes another speed limit for the circular speed at which $r\omega^3$ or $r\omega^4$ becomes constant, where $\omega$ is the angular frequency. The computer performs the circular interpolation control by safeguarding the circular speed from exceeding one of the speed limits in accordance with the command radius r of the circular interpolation control.

5 Claims, 6 Drawing Sheets

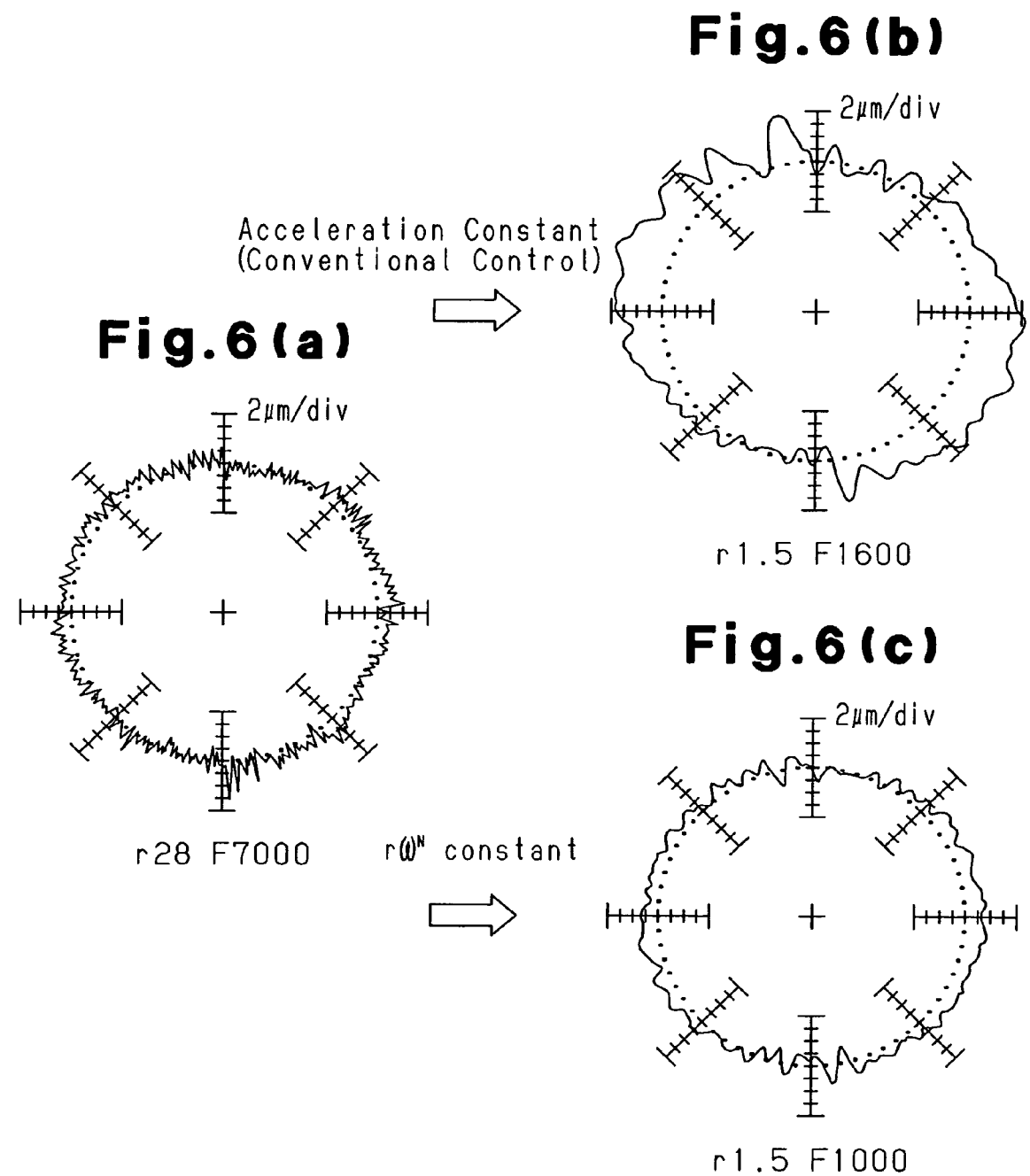

Error caused by amplitude difference

Error caused by phase difference

METHOD AND APPARATUS FOR CONTROLLING A MACHINE TOOL

BACKGROUND OF THE INVENTION

The present invention relates to a method and apparatus for controlling a machine tool that performs circular interpolation control. More particularly, the present invention pertains to a method and apparatus for controlling a machine tool that performs high-precision cutting that is not achieved by a conventional circular speed restriction method.

New processing methods that use circular interpolation control have been expected to be developed in recent years. The processing methods include direct tapping, which forms a thread by a helical movement, orbit boring, which uses a single tool for forming several cylindrical bores having different diameters, and end milling, which does not use a boring bar. All the processing methods are aimed at improving the processing efficiency by reducing the number of times a tool must be exchanged. However, since the new methods do not excel over a conventional machining method, such as tapping and boring, in machining, the new methods have not replaced conventional methods. Circular interpolation control has been highly developed by technical improvements such as modification in the interpolation cycle and the interpolation unit of computer numerical control (CNC) and speeding up of a servo control process to obtain high gain. However, most of the circular interpolations used in the above machining methods are applied to a small diameter circle. Therefore, although the control technology has improved, the demanded accuracy is not easily achieved. Thus, there is a strong demand for improving the accuracy when controlling small diameter circular motion of a tool at a high speed.

As means for maintaining the accuracy of the circular interpolation, a method of restricting the feed rate is generally used to suppress the normal acceleration in circular motion to be less than or equal to a certain value. This method is effective for a contraction phenomenon of the arc radius caused mainly by tracking delay in the servo system. The contraction of arc radius is reduced by the improvement of the servo performance. However, the increased machining speed causes the normal acceleration in circular motion to act on the machine as a great inertia force. This results in a machine flexure, which significantly influences the accuracy of the circular interpolation. The phenomenon is particularly significant in the machining of a small circle and it is difficult to maintain the machining accuracy.

The conventional circular speed restriction method will now be described. The conventional circular speed restriction method is used to improve the machining accuracy when forming an arc or a perfect circle on a workpiece with a tool. The method controls the speed of the tool along the arc such that the acceleration of the tool does not exceed a certain value. The method is based on a theoretical arc radius reduction error amount $\Delta R$ (mm) obtained using the following equation (1) in accordance with the delay of position loop control.

$$\Delta R = \frac{\left(\frac{F}{60}\right)^2}{2R} \cdot \frac{1 - K_f^2}{K_p^2} \quad (1)$$

Where F represents the feed rate of the tool (mm/min), R represents the arc radius (mm), Kp represents position loop gain ($S^{-1}$), and Kf represents the feedforward coefficient.

As the circular motion of the tool (feed rate F) increases, or the arc radius R is decreased, the acceleration is increased, which in turn increases the arc radius reduction error amount $\Delta R$. Therefore, the conventional circular speed restriction method restricts the speed such that the acceleration does not exceed the upper limit to suppress the arc radius reduction error amount $\Delta R$ to be less than or equal to a certain value.

The method is effective if the main cause of the error in the circular track is delay from position loop control. In recent years, however, the feedforward coefficient Kf is set to a value close to one and delay from position loop control hardly occurs. According to the above equation (1), if the feedforward coefficient Kf is set to a value close to one, the right side of the equation (1) will be close to zero. Therefore, circular track error should not occur. However, in actual circular interpolation control, the demanded accuracy is not satisfied. This is because of a phenomenon different from that represented by the equation (1).

FIG. 7(a) shows the circularity (actual measurement) of the circular interpolation when the arc radius and the speed are varied. The horizontal axis represents the arc radius and the vertical axis represents the acceleration (square of the speed divided by the arc radius). Lines (constant circularity lines) in FIG. 7(a) are described by plotting points that represent a constant circularity when the arc radius and the acceleration are varied. If the circularity is proportional to the acceleration, each circularity line should extend parallel to the horizontal axis in FIG. 7 (a). However, in fact, the circularity deteriorates as the arc radius decreases as shown in FIG. 7(a).

SUMMARY OF THE INVENTION

Accordingly, it is an objective of the present invention to provide a method and an apparatus for controlling a machine tool that performs high-precision cutting without using a conventional circular speed restriction method when command radius from circular interpolation control is less than or equal to a predetermined threshold value while performing circular interpolation of small diameter.

To achieve the above objective, the present invention provides a control apparatus for a machine tool for performing circular interpolation control. The apparatus includes computing means and control means. When command radius r of the circular interpolation control is less than or equal to a threshold value, the computing means computes a speed limit for the circular speed and $r\omega^3$ ($\omega$ is the angular frequency) or $r\omega^4$ becomes constant at the computed speed limit. The control means performs the circular interpolation control by safeguarding the circular speed from exceeding the speed limit.

The invention in a second aspect provides a control apparatus for a machine tool for performing a circular interpolation control. The apparatus includes computing means and control means. When the command radius r for circular interpolation control exceeds a threshold value, the computing means computes a speed limit for the circular speed, and the acceleration becomes constant at the computed speed limit. When the command radius r for the circular interpolation control is less than or equal to the threshold value, the computing means computes a speed limit at which $r\omega^3$ ($\omega$ is the angular frequency) or $r\omega^4$ becomes constant. The control means performs the circular interpolation control by safeguarding the circular speed from exceeding one of the speed limits in accordance with the command radius r of the circular interpolation control.

The principle of this invention will now be described.

FIG. 3 is a block diagram showing the transfer function G from a position command section of control means to a machine end position. The control means is the CNC (computer numerical control) apparatus. The control means includes a command section, which sends a position command for a control target for circular interpolation control. The transfer function G from the position command output from the command section to the machine end position is represented by the following equation (2).

[Equation 2]

$$G = 1 - \frac{as^2}{s^2 + 2\zeta\omega_1 s + \omega_1^2} \quad (2)$$

Where s represents the Laplace operator, $\omega_1$ represents the characteristic frequency of the machine, $\zeta$ represents the damping ratio, and a represents the degree of influence that the acceleration of the motion has on the vibration.

When the gain of the transfer function G is calculated assuming that s is equal to $j\omega$ ($s=j\omega$), for example, if the angular frequency $\omega$ of the tool is significantly smaller than the characteristic frequency $\omega 1$ of the machine ($\omega<<\omega 1$), the following equation (3) is obtained. The transfer function G is rationalized and only the real part is extracted. The equation (2) is organized using the relationship of $1/(1-x) \approx 1+x$ ($x<<1$).

[Equation 3]

$$|G(j\omega)| = 1 + \frac{a\omega^2}{\omega_1^2} + (1 - 4\zeta^2)\frac{a\omega^4}{\omega_1^4} \quad (3)$$

The gain (the absolute value of G ($j\omega$)) has a term including the square of $\omega$ and a term including the biquadrate of $\omega$. The error between the position command value and the actual value is proportional to the command radius r (arc radius), which is the input amplitude to the transfer function G. Therefore, the error is calculated by multiplying each term of the equation (3) by the command radius r. When the command radius r (arc radius) is great, the influence on the error is significant of the term including the square of $\omega$, that is, the acceleration. However, when the command radius r (arc radius) decreases and the angular frequency $\omega$ (angular speed) increases, the term including the biquadrate of $\omega$ starts to influence the error.

In the circular interpolation control, the difference in the rigidity of the machine along the x-axis and the y-axis appears as the error of the arc radius along the x-axis and the y-axis. The error of the arc radius is proportional to $r\omega^2$ and $r\omega^4$.

In the conventional circular speed restriction method, the difference in the amplitude of the machine along the x-axis and the y-axis appears as the error-of the radius along the x-axis and the y-axis as shown in FIG. 7(b). FIG. 7(b) is a graph of error caused by the difference in the amplitude of the machine caused along the x-axis and the y-axis (corresponding to the error of the radius along the x-axis and the y-axis) extracted from FIG. 7(a). In the conventional circular speed restriction method, the error caused by the amplitude difference depends on the acceleration $r\omega^2$, but as the command radius r (arc radius) decreases, the component that is proportional to the term including the biquadrate of $\omega$ (more precisely, biquadrate of $\omega$ multiplied by the radius r) increases.

On the other hand, the phase of the transfer function G is represented by the following equation (4). The transfer function G is rationalized and only the imaginary part is extracted.

$$\tan\angle G(j\omega) = -2a\zeta\left(\frac{\omega^3}{\omega_1^3} + 2(1-2\zeta^2)\frac{\omega^5}{\omega_1^5}\right) \quad (4)$$

As described above, the phase has a term including the cube of $\omega$ and a term including the fifth power of $\omega$. When the angular frequency $\omega$ of the tool is significantly smaller than the characteristic frequency $\omega_1$ of the machine ($\omega<<\omega_1$), the influence on the phase is significant of the term including the cube of $\omega$. The response phase difference between the x-axis and the y-axis appears as a radius error in a direction of 45 degrees of the arc (four directions that intersect the x-axis and the y-axis at an angle of 45 degrees). The actual error is proportional to the command radius r (arc radius), which is the input amplitude to the transfer function G. The error is calculated by multiplying each term of the equation (4) by the command radius r.

Therefore, in the case of the phase difference, as the movement speed of the tool along the arc increases, and as the command radius r (arc radius) is decreased, the influence of the term including the cube of $\omega$ is significant.

In the conventional circular speed restriction method, the phase difference appears as the radius error as shown in FIG. 7(c). FIG. 7(c) is a graph showing the error caused by the phase difference extracted from FIG. 7(a). The error is proportional to $r\omega^3$.

Therefore, according to the present invention, when the command radius r is less than or equal to the threshold value, the speed limit of the circular speed at which $r\omega^3$ ($\omega$ is the angular frequency) or $r\omega^4$ becomes constant is calculated. The speed limit at which one of $r\omega^3$ and $r\omega^4$ become constant is used as a guard value, and the circular interpolation control is performed such that the circular speed does not exceed the speed limit. In this manner, during the circular interpolation control, when the command radius r is less than or equal to the threshold value, the tool is controlled to not exceed the upper limit of the acceleration. Thus, unlike the conventional circular speed restriction method, high-precision control is performed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 6(a), (b), and (c) are explanatory diagrams illustrating the circular accuracy;

DETAILED DESCRIPTION OF THE PREFERRED EMBODIMENTS

Figure 1:
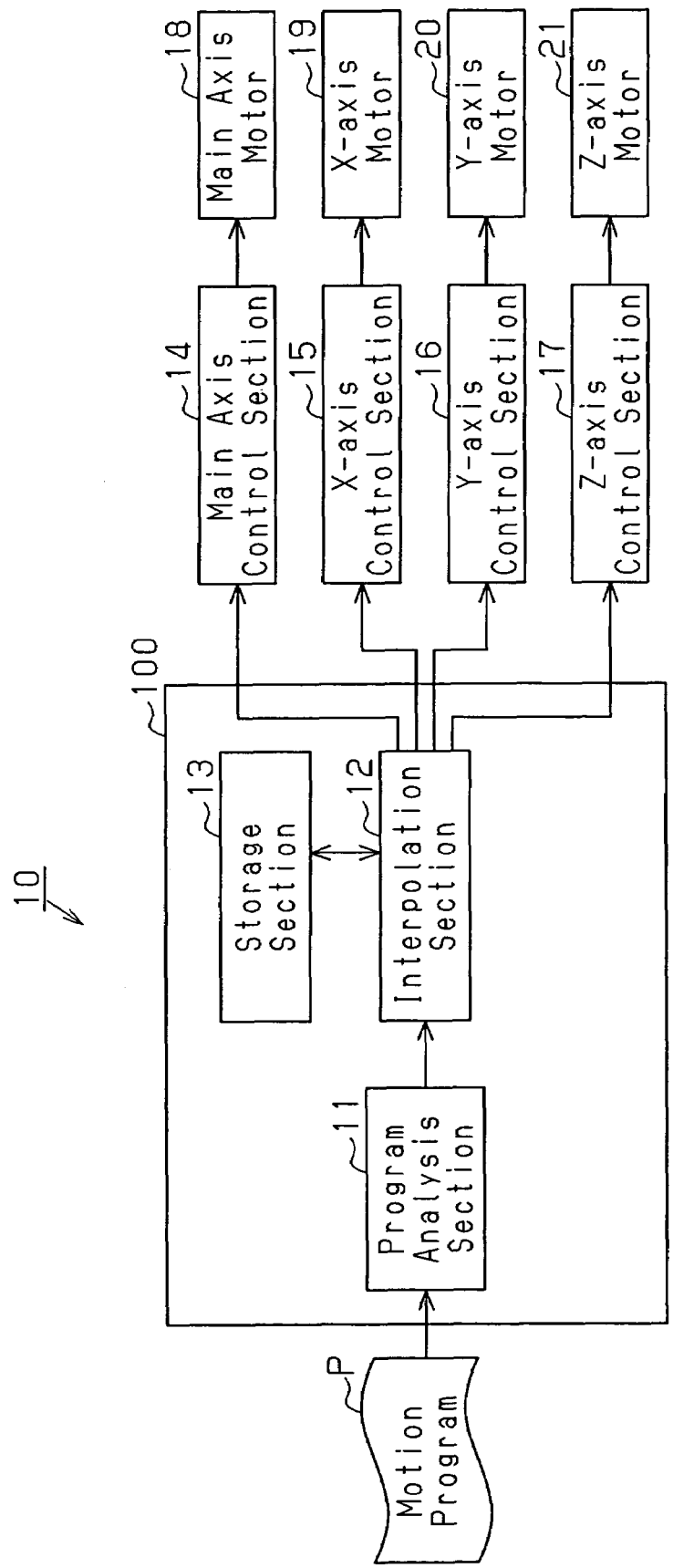
FIG. 1 is a block diagram illustrating a control apparatus for a machine tool according to a preferred embodiment of the present invention.
Figure 2:
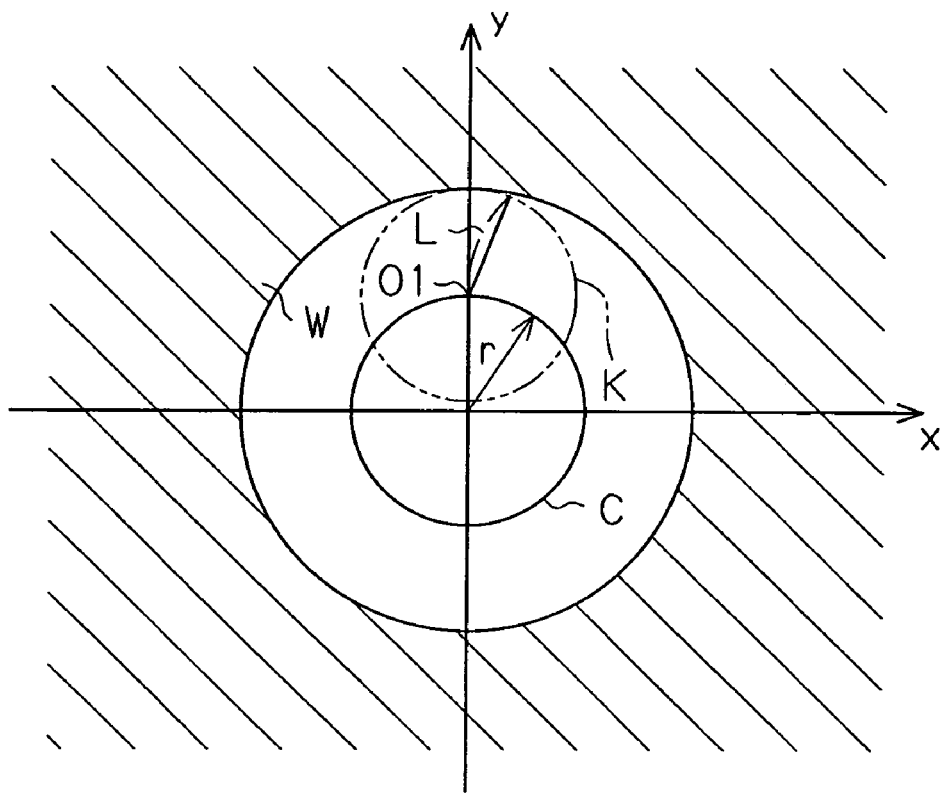
FIG. 2 is a schematic explanatory diagram showing tornado processing.
Figure 3:
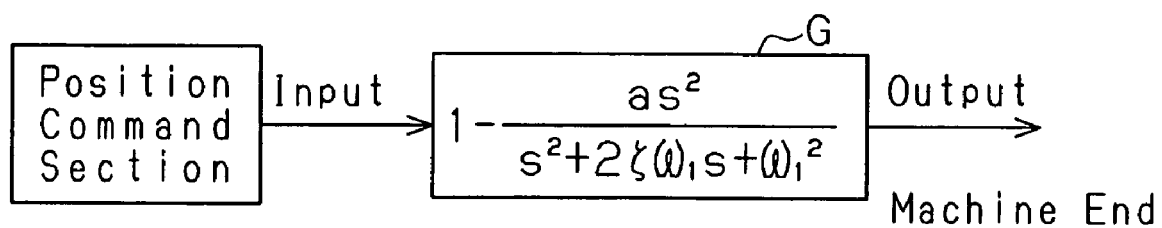
FIG. 3 is a block diagram showing the transfer function G from a position command section of control means to a machine end position.

A machine tool according to one embodiment of the present invention will now be described with reference to FIGS. 1, 2, and 4 to 6. FIG. 1 is a control block diagram showing a numerical control apparatus 10 for the machine tool. FIG. 2 is a schematic explanatory diagram showing tornado processing. The tornado processing is a method for performing circular interpolation control on the xy-coordinate plane while moving an end mill along the z-axis direction.

The tornado processing is briefly explained with reference to FIG. 2. In FIG. 2, an end mill K is attached to a main shaft (not shown), which has a main axis O1. In the tornado processing, the main shaft and a workpiece W move relative to each other along the x-axis and the y-axis, that is, on the xy-coordinate plane to perform the circular interpolation motion, and move relative to each other in the z-axis direction (a direction perpendicular to the surface of the sheet of FIG. 2) to perform linear interpolation motion. As a result, the main axis O1 describes a circular interpolation track indicated by the letter C in FIG. 2 while performing linear interpolation motion in the z-axis direction. The end mill K rotates while moving along the circular interpolation track C so that the cut-out portion of the workpiece W has the radius of (r+L). The letter r represents the command radius r (arc radius) of the circular interpolation motion and the letter L represents the radius of the end mill K.

The numerical control apparatus 10 will now be described with reference to FIG. 1. The numerical control apparatus 10 is formed by a computer 100, which includes a CPU, a ROM, and a RAM. The numerical control apparatus 10 includes a program analysis section 11, an interpolation section 12, and a storage section 13. The program analysis section 11 reads a motion program P ahead and analyzes the interpolation data. The program analysis section 11 stores the analyzed interpolation data in a buffer memory, which is not shown, in the storage section 13. The interpolation section 12 reads the interpolation data from the buffer memory and performs an interpolation computation based on the interpolation data. The interpolation section 12 calculates the movement amount and the feed rate corresponding to each control axis and performs the circular interpolation control. The storage section 13 stores several control parameters necessary for the interpolation computation. The storage section 13 is formed by the RAM and corresponds to storage means. The computer 100 corresponds to control means.

The interpolation section 12 calculates the position command (speed command) of each control axis (in this embodiment, the main axis, the x-axis, the y-axis, and the z-axis) of the machine tool. In this embodiment, the interpolation section 12 corresponds to a position command section and speed limit computing means.

The calculated position command for each control axis is supplied to a main axis control section 14, an x-axis control section 15, a y-axis control section 16, and a z-axis control section 17 from the interpolation section 12. A main axis motor 18, an x-axis motor 19, a y-axis motor 20, and a z-axis motor 21 are electrically connected to the main axis control section 14, the x-axis control section 15, the y-axis control section 16, and the z-axis control section 17, respectively. The main axis control section 14, the x-axis control section 15, the y-axis control section 16, and the z-axis control section 17 drive the associated motor in accordance with the received position command. Each motor is formed by a servo motor.

Figure 4:
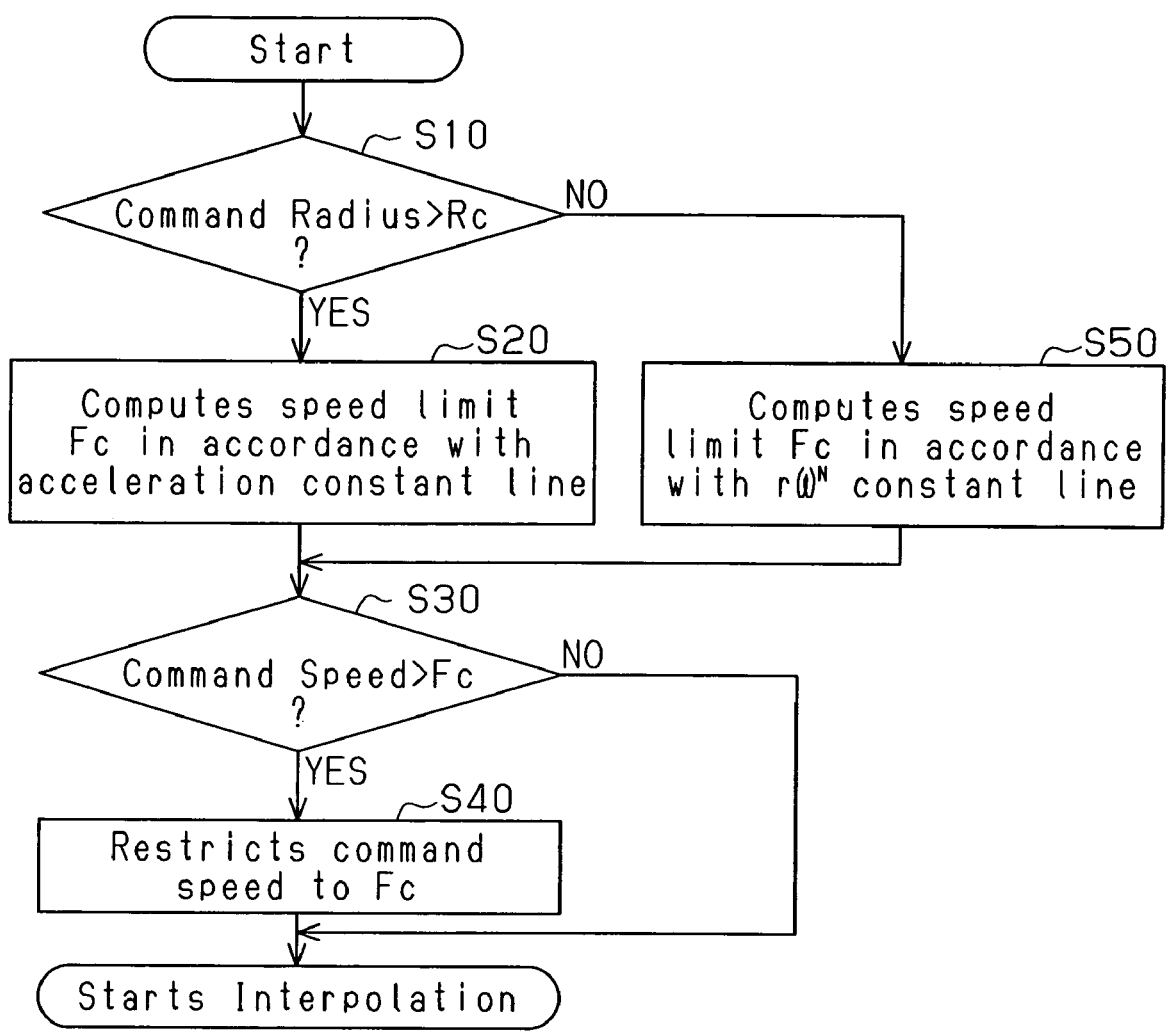
FIG. 4 is a flowchart of a command speed setting routine executed by an interpolation section (CPU)

FIG. 4 is a flowchart of a command speed setting routine executed by the interpolation section 12 (CPU). At step S10, the interpolation section 12 reads a control parameter stored in the storage section 13, which is a threshold value Rc in this embodiment, and compares the command radius based on the motion program P with the threshold value Rc. The command radius is the arc radius when performing the circular interpolation motion.

The threshold value Rc is set as described below in this embodiment.

Figure 5:
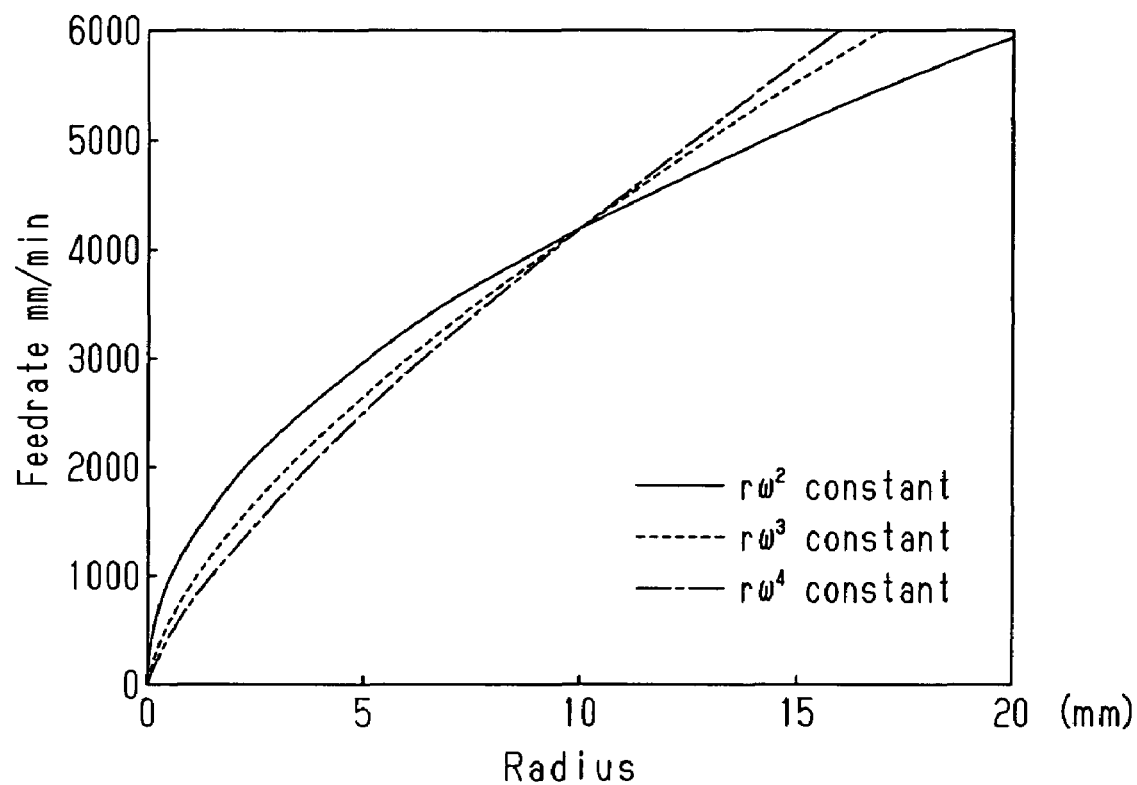
FIG. 5 is a schematic diagram showing a speed limit map stored in a storage section.
Figure 7A:
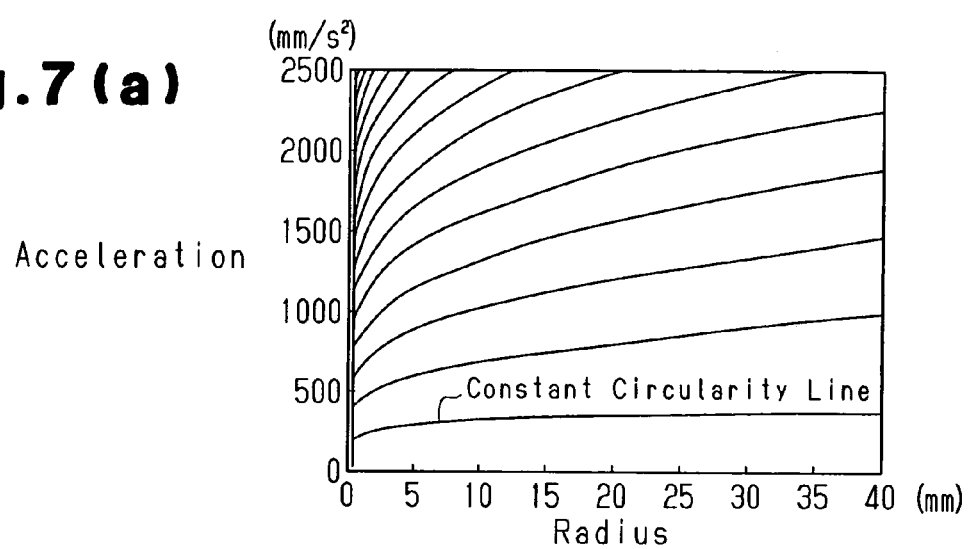
FIG. 7(a) is an explanatory diagram showing the circularity of the circular interpolation when the arc radius and the speed are varied.
Figure 7B:
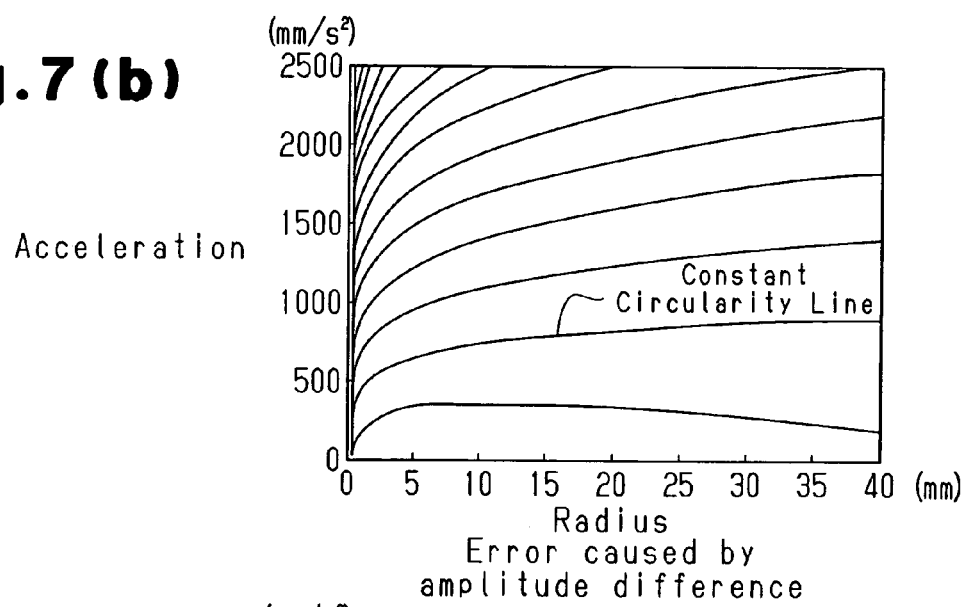
FIG. 7(b) is an explanatory diagram showing the error caused by the amplitude difference.
Figure 7C:
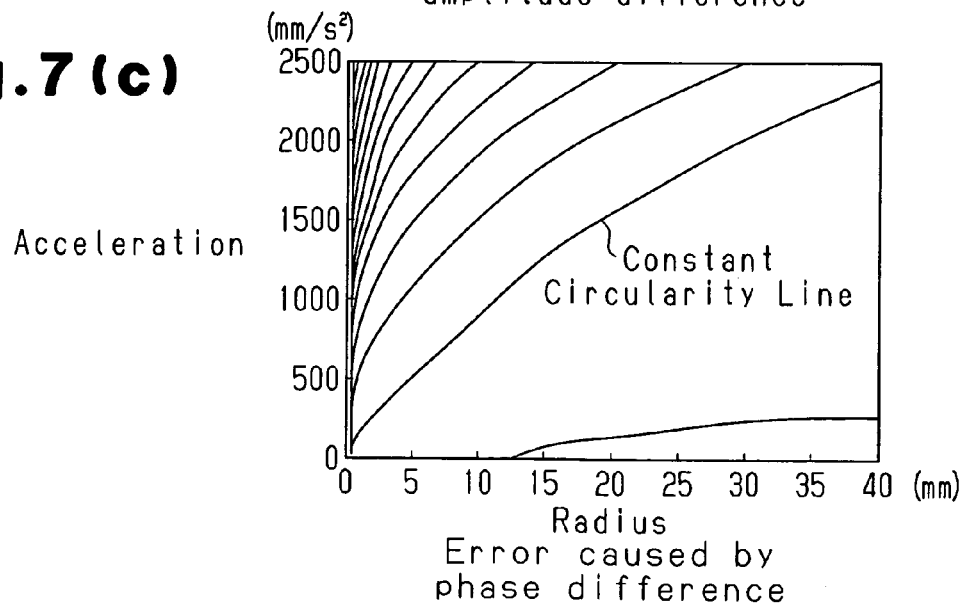
FIG. 7(c) is an explanatory diagram showing the error caused by the phase difference.

FIG. 5 is a schematic diagram showing a speed limit map stored in the storage section 13. As shown in FIG. 5, the speed limit map is used to determine the speed limit Fc of the feed rate relative to the command radius r (arc radius). The horizontal axis represents the command radius (arc radius) and the vertical axis represents the feed rate. FIG. 5 shows lines where each of values $r\omega^2$, $r\omega^3$, $r\omega^4$ becomes constant. The transfer function G from the interpolation section 12 to the machine end is obtained in advance based on the specification of the machine tool according to the preferred embodiment. The lines are obtained by calculations through simulation.

In this embodiment, the values $r\omega^2$, $r\omega^3$, $r\omega^4$ are determined such that the lines intersect each other when the threshold value Rc is 10 mm. The threshold value Rc is not limited to 10 mm, but may be set to other values in accordance with the specification of the machine tool. The threshold value Rc may be stored in the storage section 13 in advance or incorporated in the motion program P by an input device, which is not shown.

The method for obtaining the threshold value Rc to be mapped will now be described. For example, the maximum feed rate $F_1$ at which the error is less than or equal to a tolerance value when the radius $R_1$ is 40 mm is obtained by performing test cutting in advance using the conventional circular speed restriction method. Then, the acceleration constant value ($C_1 = F_1^2/R_1$) is calculated.

Next, the maximum feed rate $F_2$ at which the error is less than or equal to the tolerance value when the radius $R_2$ is 1 mm is obtained by performing test cutting in advance using the conventional circular speed restriction method. If the error is significant at a particular angle (0°, 90°, 180°, or 270°: the angle of a line that passes through the origin on the xy-plane), the $r\omega^4$ constant line is employed. If the error is significant at a particular angle (45°, 135°, 225°, or 315°: same as above), the $r\omega^3$ constant line is employed.

When the $r\omega^4$ constant line is employed, the constant value ($C_2=F_2^4/R_2^3$) is calculated, and when the $r\omega^3$ constant line is employed, the constant value ($C_2=F_2^3/R_2^2$) is calculated.

When the $r\omega^4$ constant line is employed, F is eliminated from the simultaneous equations $C_1=F^2/Rc$, $C_2=F^4/Rc^3$ to obtain the threshold value Rc.

The threshold value Rc when the $r\omega^3$ constant line is employed is obtained in the same manner.

In FIG. 5, the $r\omega^2$ constant line is referred to as an acceleration constant line, and the $r\omega^3$ constant line and the $r\omega^4$ constant line are referred to as $r\omega^N$ constant lines (N=3, 4).

Looking at the flowchart again, if the command radius r is greater than the threshold value Rc at step S10, the interpolation section (CPU) 12 proceeds to step S20. At step S20, the interpolation section (CPU) 12 determines the speed limit Fc corresponding to the command radius r in accordance with the acceleration constant line corresponding to the command radius r in the speed limit map, and proceeds to step S30. At step S10, if the command radius r is less than or equal to the threshold value Rc, the interpolation section (CPU) 12 proceeds to step S50. At step S50, the interpolation section (CPU) 12 determines the speed limit Fc corresponding to the command radius r in accordance with the $r\omega^N$ constant line corresponding to the command radius r in the speed limit map, and proceeds to step S30.

In this embodiment, the $r\omega^N$ constant line is assumed to be the $r\omega^4$ constant line, but the $r\omega^N$ constant line may be assumed to be the $r\omega^3$ constant line. When the $r\omega^N$ constant line is assumed to be the $r\omega^4$ constant line, the speed limit Fc of the $r\omega^4$ constant is determined. Therefore, the radius error caused by the amplitude difference between the x-axis and the y-axis is suppressed to a constant value. When the $r\omega^N$ constant line is assumed to be the $r\omega^3$ constant line, the speed limit Fc of the $r\omega^3$ constant is determined. Therefore, the radius error caused by the phase difference between the x-axis and the y-axis is suppressed to a constant value.

At step S30, the interpolation section (CPU) 12 determines whether the command speed based on the motion program P exceeds the speed limit Fc. At step S30, if the command speed based on the motion program P exceeds the speed limit Fc, the interpolation section (CPU) 12 proceeds to step S40. At step S40, the interpolation section 12 restricts the command speed to the speed limit Fc and safeguards the command speed, and then terminates this routine. At step S30, if the command speed is less than or equal to the speed limit Fc, the interpolation section 12 does not safeguard the command speed and terminates this routine. After the routine is terminated, the interpolation section 12 starts the interpolation processing routine, which is not shown. In the interpolation processing routine, the interpolation section 12 computes the position command (speed command) for each control axis based on the calculated command speed (including the speed limit Fc obtained at step S40) and the command radius r. Since this computation is not an important part of this invention and is also a known technique, the explanation is omitted.

The preferred embodiment provides the following advantages.

(1) In the preferred embodiment, if the command radius r is less than or equal to the threshold value Rc, the speed limit Fc of the $r\omega^4$ constant is determined in accordance with the speed limit map. Therefore, the radius error caused by the amplitude difference between the x-axis and the y-axis is suppressed to a constant value.

FIG. 6(a) shows the circular accuracy when the command radius r (arc radius) is 28 mm and the circular speed (feed rate) F is 7000 mm/min. FIG. 6(b) shows the circular accuracy when the command radius r (arc radius) is set to 1.5 mm and the circular speed (feed rate) F is set to 1600 mm/min in accordance with only the acceleration constant line. The measurement condition is the same as that of FIG. 6(a). FIG. 6(c) shows the circular accuracy when the command radius r (arc radius) is set to 1.5 mm and the circular speed (feed rate) F is set to 1000 mm/min in accordance with only the $r\omega^4$ constant line. The measurement condition is the same as that of FIG. 6(a). As shown in FIG. 6(b), when only the acceleration constant line is employed, errors caused by both the amplitude difference and the phase difference between the x-axis and the y-axis influence the circular accuracy and an elliptic track is described. Contrarily, in FIG. 6(c), the errors are suppressed.

(2) In this embodiment, when the command radius r is less than or equal to the threshold value Rc and the speed limit Fc for $r\omega^4$ constant is determined in accordance with the speed limit map, the circular speed is restricted to be slower than the speed limit Fc for $r\omega^3$ constant. Therefore, machining accuracy is increased as compared to the case with $r\omega^3$ constant.

When the command radius r is less than or equal to the threshold value Rc, and the speed limit Fc for $r\omega^3$ constant is determined in accordance with the speed limit map, the circular speed is faster than the speed limit Fc for $r\omega^4$ constant. Therefore, the machining efficiency is improved as compared to the case with the speed limit Fc for $r\omega^4$ constant.

The present invention is not limited to the preferred embodiment but may be modified as follows.

In the preferred embodiment, the invention is embodied in a numerical control apparatus 10, which performs tornado processing. However, the invention may be embodied in any machine tool as long as the machine tool performs circular interpolation motion. For example, the present invention may be embodied in a control apparatus of a machine tool that performs direct tapping in which a thread is formed through a helical movement, or a control apparatus that performs orbit boring or circular machining with an end mill.

Among the circular interpolation controls for which the present invention is intended, the control for machining a small circle, in particular, refers to machining of a circle with the command radius (arc radius) of less than or equal to 10 mm in this embodiment. However, the command radius is not limited to 10 mm but may be less than or equal to 15 mm or 20 mm. As the command radius (arc radius) decreases, the invention becomes more effective.

The invention claimed is:

1. A control apparatus for a machine tool for performing circular interpolation control, the apparatus comprising:
   computing means for when a command radius r of the circular interpolation control exceeds a threshold value, computing a speed limit for circular speed, in which the acceleration becomes constant at the computed speed limit, and when the command radius r of the circular interpolation control is less than or equal to the threshold value, the computing means computes another speed limit at which $r\omega^3$ or $r\omega^4$ becomes constant, where $\omega$ is an angular frequency of a circular motion on the machine tool; and
   control means for performing the circular interpolation control by safeguarding the circular speed from exceeding one of the speed limits in accordance with the command radius r of the circular interpolation control.

2. The control apparatus according to claim 1, further comprising storage means for storing the threshold value, wherein
the speed limit computing means computes the speed limit using the threshold value stored in the storage means.

3. A method for controlling a machine tool, which performs circular interpolation control, the method comprising:
when a command radius r of the circular interpolation control exceeds a threshold value, computing a speed limit for circular speed, wherein the acceleration becomes constant at the computed speed limit, and when the command radius r of the circular interpolation control is less than or equal to the threshold value, computing another speed limit at which $r\omega^3$ or $r\omega^4$ becomes constant, where $\omega$ is an angular frequency of a circular motion on the machine tool; and
performing the circular interpolation control by safeguarding the circular speed from exceeding one of the speed limits in accordance with the command radius r of the circular interpolation control.

4. The method for controlling a machine tool according to claim 3, further comprising storing the threshold value in a memory for retrieval and use in said computing a speed limit for circular speed.

5. The method for controlling a machine tool according to claim 3, wherein said computing a speed limit is performed by using a computer.

* * * * *